Oct. 1, 1968   H. CHEVALIER ET AL   3,403,554

DEVICE FOR THE STUDY OF BUBBLE FLOW WITHIN A PIPE

Filed Aug. 24, 1965

INVENTORS
HENRI CHEVALIER
CLAUDE LAKME
JACQUES MAX

BY Bacon & Thomas ATTORNEYS

United States Patent Office 3,403,554
Patented Oct. 1, 1968

3,403,554
DEVICE FOR THE STUDY OF BUBBLE
FLOW WITHIN A PIPE
Henri Chevalier and Claude Lakme, Grenoble, and
Jacques Max, Seyssinet, France, assignors to Commissariat à l'Energie Atomique, Paris, France
Filed Aug. 24, 1965, Ser. No. 482,207
Claims priority, application France, Aug. 27, 1964,
986,393
3 Claims. (Cl. 73—194)

ABSTRACT OF THE DISCLOSURE

Apparatus for determining the velocity of bubbles passing through a vertical section of a fluid filled pipe. The sensing tips of a pair of detecting probes are located within the pipe and spaced apart a predetermined distance along a vertical line. A first coincidence circuit produces an output signal when signals are applied to each of its two inputs. The output of the first probe is fed through a delay circuit to one input of the coincidence circuit and the output of the second probe is fed directly to the second input of the coincidence circuit whereby the passage through the pipe of a bubble of a predetermined velocity will produce an output from the coincidence circuit.

Other coincidence circuits receiving increasingly delayed signals from the first probe and receiving directly the signals from the second probe may be used to identify bubbles of other predetermined velocities. A counter is associated with each coincidence circuit to record its output and a master counter records the total number of bubbles and deenergizes the detecting probes after a predetermined count is reached.

---

This invention has for its object a device for measuring the velocity of bubbles flowing through a vertical pipe with a view to studying with accuracy the law of distribution of bubble velocities. The device thus contemplated is of simple constructional design and of reliable operation.

Said device is characterized in that is consists of two very thin probes, the sensitive tips of which are disposed along a vertical line within a pipe in which it is proposed to study the flow of bubbles through a fluid circulating within said pipe, each probe being designed to produce an electric pulse when reached by a bubble as a result of variation in resistance of the electric circuit in which said probe is connected.

The pulses produced by that probe which is first reached by the bubbles are transmitted by an amplifier and a shaping unit to $n$ delay devices which are associated in series and the outputs of which are coupled to one of the inputs of $n$ coincidence circuits, the outputs of said coincidence circuits being respectively connected to a corresponding number of counters whilst the pulses derived from the other probe which is the last to be reached by the bubbles are transmitted by means of an amplifier and shaping unit to the second inputs of said coincidence circuits.

In addition, according to a preferred form of embodiment, the pulses produced by the shaping unit which is associated with one of the probes are applied to a digital counter which controls the operation of the apparatus by determining, not the counting time, but the number of bubbles which have passed through the apparatus.

Aside from these main arrangements, the invention also relates to a certain number of secondary arrangements which will be referred-to hereinafter and is especially concerned with the constructional design of devices according to this invention.

One of the main applications of the device which has just been described concerns the study of coolant-fluid flow in boiling water reactors.

The characteristic features of this invention will be more clearly understood from the following description of one example of embodiment, it being understood that said example is not given in any limiting sense either in regard to the methods of operation or the uses to which this invention can be applied.

Figure 1:
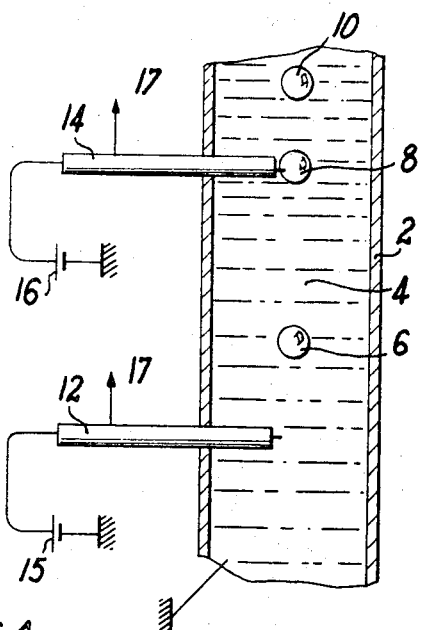
FIG. 1 shows the arrangement of measuring probes in a pipe in which the flow of a fluid is under study.

There has been shown in FIG. 1 a pipe 2 and a fluid 4 which is circulated within said pipe and through which bubbles 6, 8, 10 . . . travel in an upward direction. The vertical wall of the pipe 2 is traversed by probes 12–14, the very thin and sensitive tips of which are placed within the fluid on the same vertical line at equal distance from the generator-line of the tube which supports said probes. The probes are polarized by voltage source 15, 16 and the pipe 2 is electrically connected to ground (earth). Taking the example of a bubble 6 having a rectilineal path parallel to the axis of the channel in which said bubble strikes the probe 12 at an instant $t$, the variation in resistance of the circuit in which said probe is connected initiates the application of an electric pulse to a device for calculating the velocity of the bubbles such as 6, 8, or 10. The appearance of said pulse indicates the passage of a bubble in front of the probe 12.

If a velocity $v$ is imparted to said bubble, it will reach the probe 14 at the instant $t+1/v$, wherein 1 is the distance between the two probes, and will thus initiate the application of a pulse B to the device 17.

These two electric pulses A and B are therefore separated by a time interval $\tau=1/v$ which is characteristic of the velocity; if the pulse derived from the first probe (12) is delayed by the time interval $\tau$, the pulses derived from both probes will be made simultaneous and it will accordingly be possible to utilize these signals for the purpose of triggering a coincidence circuit which will produce a pulse whenever a bubble passes through the pipe at a predetermined velocity $v$. In the case of a given delay $\tau$, it is thus possible to count the bubbles which are endowed with a velocity $v=1/\tau$ if the output of said coincidence circuit is coupled to a counter.

Since the bubbles do not all have the same velocity, it is an advantage to repeat the operation described above in the case of different pulse delays. The coincidences relative to a number of different pulse delays, for example ten, are then counted simultaneously and the number of bubbles having the ten velocities which correspond to the ten delays chosen can be determined. Under these conditions, it is easy to determine the curve $N=f(v)$ of distribution of velocities as well as the maximum value of N.

Finally, in order to improve the accuracy of results, the measurement is not effected over a predetermined period of time but is effected during the passage of a constant number of bubbles in front of one of the probes. This number N of bubbles can be pre-set at the start of the measurement and have been determined by means of a rapid preliminary test in accordance with a compromise between the requisite degree of accuracy and the time interval available for the measurement.

Figure 2:
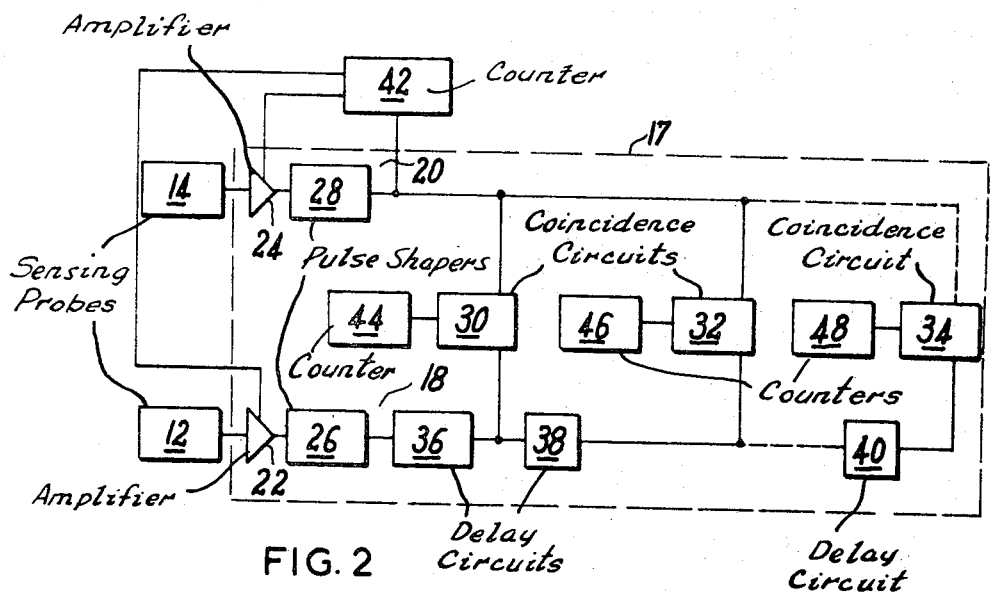
FIG. 2 is a block diagram of the device according to the present invention.

There will now be described in reference to FIG. 2 the complete device for calculating velocities of bubles such as 6, 8, or 10 traveling through a pipe. Both figures comprise similar elements which are designated by the same reference numerals. The pulses derived from the probes 12 and 14 are respectively applied to two channels 18, 20 of different structure which form part of the computer unit 17. Said two channels each comprise an amplifier (22 or 24) and a shaping unit (26 or 28).

The amplifiers have an adjustable gain, thus making it possible to standardize the amplitudes of signals derived from the probes in such a manner as to eliminate the disadvantage which arises from the use of probes having different sensitivities.

The shaping units (26 or 28) are multivibrators which convert the amplified pulses into square-wave signals having constant amplitude and finite width, the tripping of said multivibrators being produced at a fairly low threshold in order to eliminate any fluctuations in the time of appearance of pulses according to the size of bubbles. The threshold referred-to must nevertheless be sufficiently high to eliminate background noise as far as possible.

The pulses which appear at the output of the shaping unit 26 are applied to the first inputs of a plurality of coincidence circuits 30, 32, . . . , 34 by means of a plurality of delay devices 36, 38, . . . , 40 connected in series. The pulses which appear at the output of the shaping unit 28 and which are derived from the second probe 14 are applied directly to the second input of the coincidence circuits referred to above. Each coincidence circuit is connected to a counter 44, 46, . . . , 48.

The operation of the apparatus is controlled by the counting device 42 which receives the pulses produced by the probe 14, for example. At the beginning of each experiment, the number of bubbles on which the measurement is to be taken is pre-set on said counter. When this number is reached, the counter 42 blocks the amplifiers 22 and 24 at the inputs of the channels 18 and 20.

The first delay device or main delay device 36 is preferably of the pre-count type which utilizes a clock having a frequency of 1 mc./s. The other delay units or auxiliary units 38 . . . 40 usually call for the use of shift registers of known type.

What we claim is:
1. Apparatus for the study of bubble velocities within a vertical pipe filled with a liquid including,
   a first detecting probe having a sensing tip for producing a first electrical signal in response to the presence of a bubble near said tip,
   a second detecting probe having a sensing tip for producing a second electrical signal in response to the presence of a bubble near said tip,
   said sensing tips being mounted within said pipe and spaced apart a predetermined distance along a vertical line,
   coincidence circuit means, having first and second input terminals, for producing an output in response to the simultaneous application of electrical signals to said first and second input terminals,
   a first time delay circuit,
   means for applying said first electrical signal through said first time delay circuit to said first input terminal,
   means for applying said second electrical signal to said second input terminal, and
   counting means for recording the output of said coincidence circuit means.
2. Apparatus as described in claim 1 further including:
   second coincidence circuit means, having third and fourth input terminals, for producing an output in response to the simultaneous application of electrical signals to said third and fourth input terminals,
   a second time delay circuit,
   means for connecting said first input terminal through the second time delay circuit to said third input terminal,
   means for connecting said second input terminal to said fourth input terminal, and
   second counting means for recording the output of said second coincidence circuit means.
3. Apparatus as described in claim 2 further including:
   means for counting pulses of said second electrical signal and de-energizing said first and second sensing probes when a preset number of pulses have occurred.

References Cited

UNITED STATES PATENTS

| | | |
|---|---|---|
| 2,594,668 | 4/1952 | Mannal. |
| 2,683,986 | 7/1954 | Bartlett et al. |
| 2,719,287 | 9/1955 | Bartlett. |
| 3,145,025 | 8/1964 | Morrison et al. |
| 3,248,941 | 5/1966 | McArthur. |

FOREIGN PATENTS 730,598    5/1955    Great Britain.

RICHARD C. QUEISSER, *Primary Examiner.*
EDWARD D. GILHOOLY, *Assistant Examiner.*